US009338429B2

(12) United States Patent
Umeyama

(10) Patent No.: US 9,338,429 B2
(45) Date of Patent: May 10, 2016

(54) VIDEO PROCESSING APPARATUS CAPABLE OF REPRODUCING VIDEO CONTENT INCLUDING A PLURALITY OF VIDEOS AND CONTROL METHOD THEREFOR

(75) Inventor: Manabu Umeyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 983 days.

(21) Appl. No.: 12/968,809

(22) Filed: Dec. 15, 2010

(65) Prior Publication Data

US 2011/0149038 A1 Jun. 23, 2011

(30) Foreign Application Priority Data

Dec. 21, 2009 (JP) .................................. 2009-288825

(51) Int. Cl.
H04N 13/00 (2006.01)
H04N 1/00 (2006.01)
H04N 13/02 (2006.01)
G06T 3/40 (2006.01)

(52) U.S. Cl.
CPC ......... *H04N 13/004* (2013.01); *H04N 13/0014* (2013.01); *H04N 13/0278* (2013.01); *G06T 3/40* (2013.01); *G09G 2340/0407* (2013.01); *H04N 13/025* (2013.01)

(58) Field of Classification Search
None
See application file for complete search history.

(56) References Cited

U.S. PATENT DOCUMENTS

| 6,266,068 | B1* | 7/2001 | Kang et al. ..................... 345/629 |
| 7,471,292 | B2* | 12/2008 | Li ................................. 345/427 |
| 2002/0070952 | A1* | 6/2002 | Hoch ............................ 345/647 |
| 2007/0252833 | A1* | 11/2007 | Kuroki ......................... 345/427 |
| 2009/0033740 | A1* | 2/2009 | Ishikawa et al. ................ 348/39 |
| 2009/0115895 | A1 | 5/2009 | Wang |
| 2009/0265105 | A1* | 10/2009 | Davis et al. .................... 701/300 |
| 2010/0026788 | A1* | 2/2010 | Ishikawa et al. ................ 348/48 |
| 2010/0110069 | A1* | 5/2010 | Yuan ............................ 345/419 |
| 2011/0090311 | A1* | 4/2011 | Fang et al. ..................... 348/43 |
| 2011/0148858 | A1* | 6/2011 | Ni et al. ........................ 345/419 |

FOREIGN PATENT DOCUMENTS

| JP | 2006-013978 A | 1/2006 |
| JP | 2007-150747 A | 6/2007 |
| JP | 2007-215097 A | 8/2007 |
| JP | 2010-034699 A | 7/2008 |

* cited by examiner

*Primary Examiner* — Geepy Pe
*Assistant Examiner* — William Adrovel
(74) *Attorney, Agent, or Firm* — Canon USA, Inc. IP Division

(57) ABSTRACT

In a video processing apparatus, image information relating to a graphic image corresponding to a first video is converted using difference information calculated from first view-point information relating to a first video and second view-point information relating to a second video. A graphic image corresponding to the second video is generated based on the converted image information, and the generated graphic image and an image of the second video are synthesized.

20 Claims, 14 Drawing Sheets

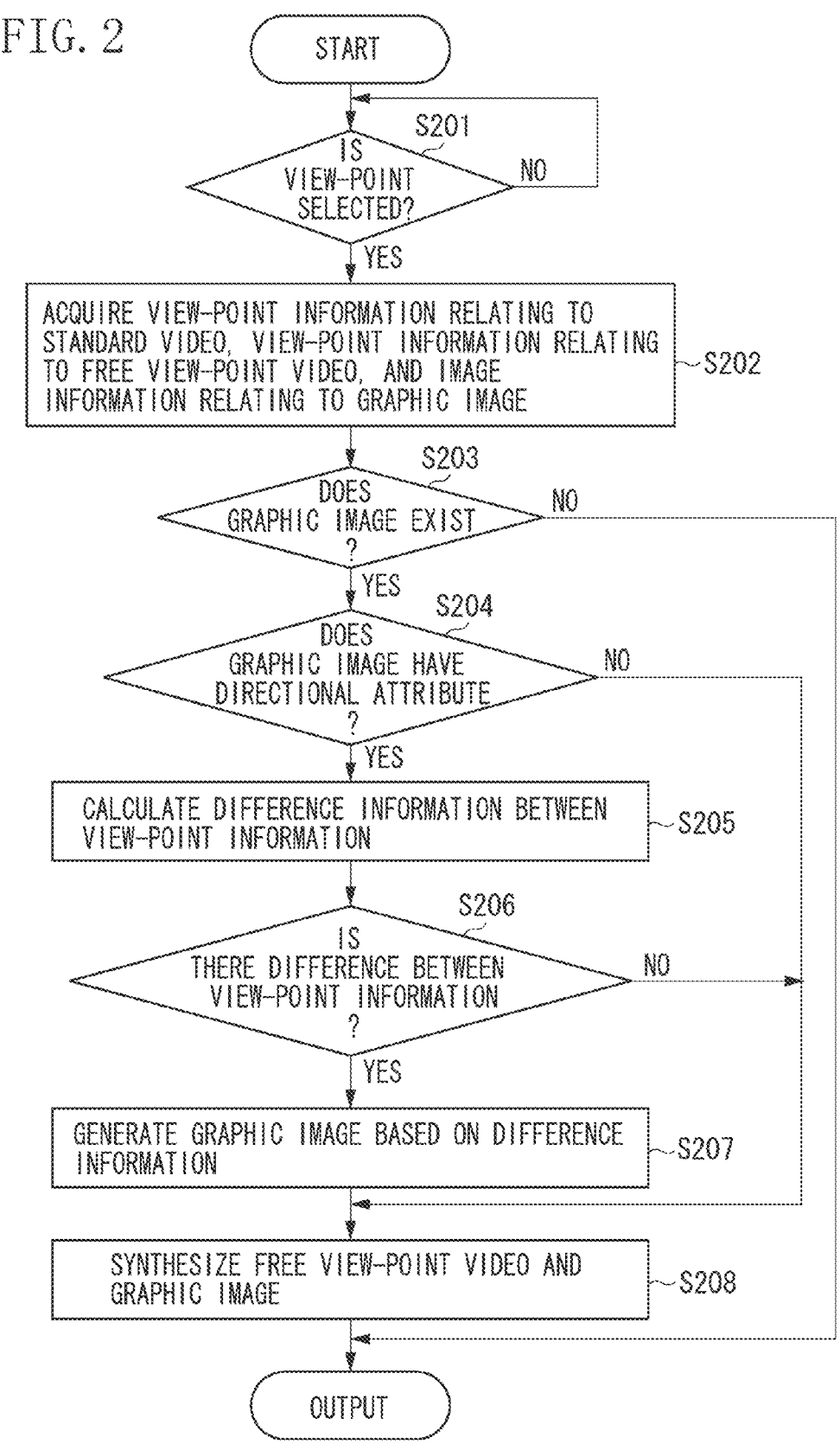

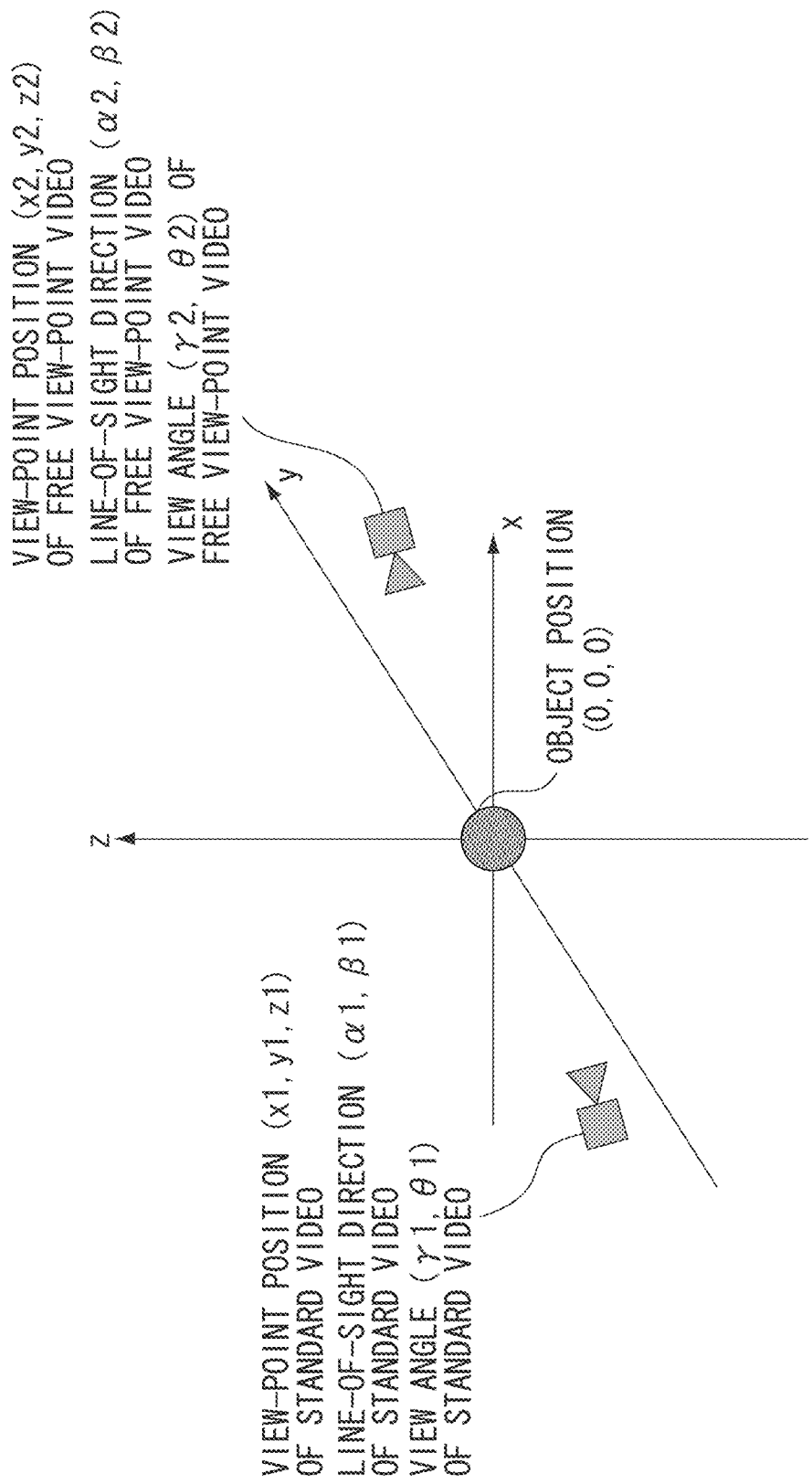

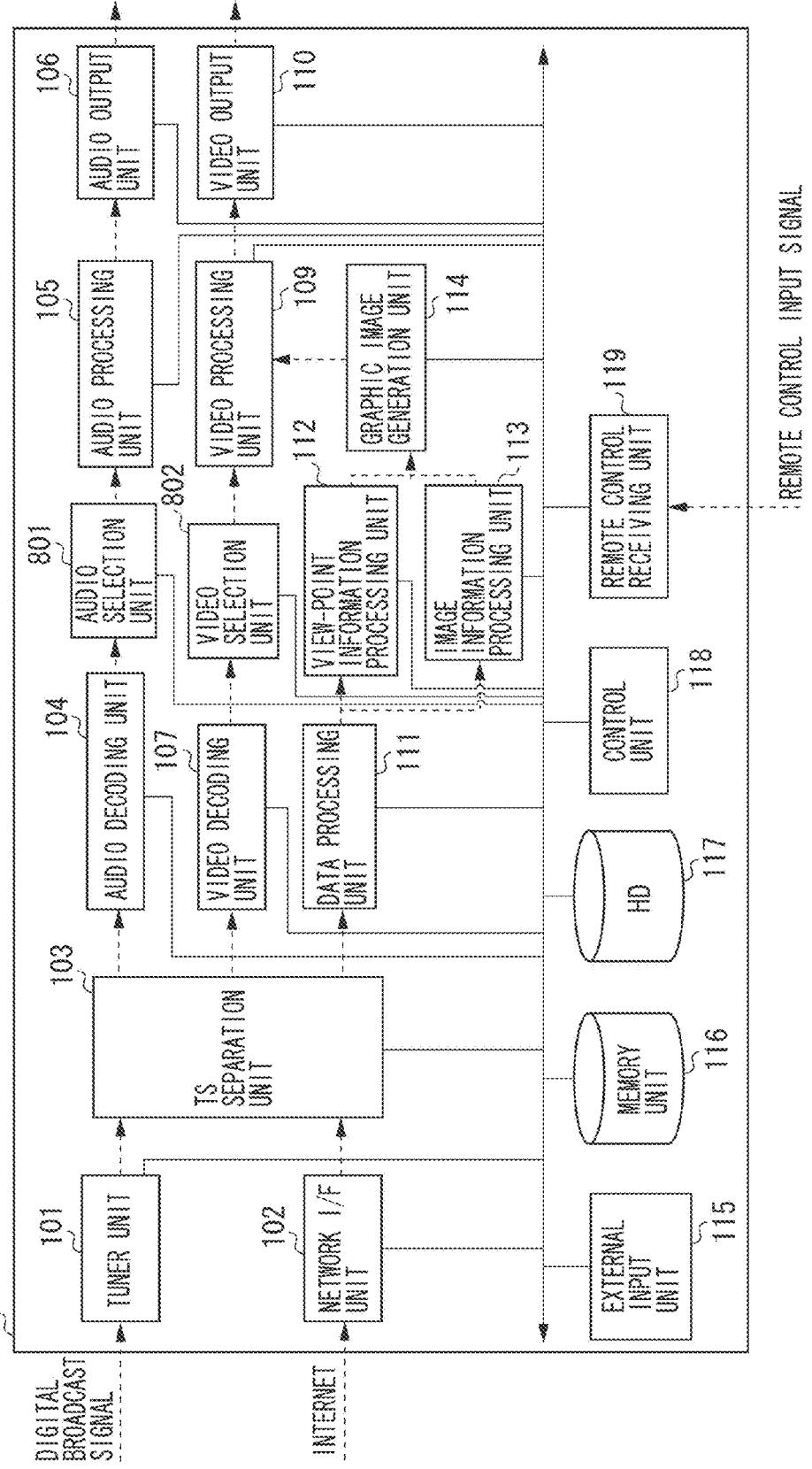

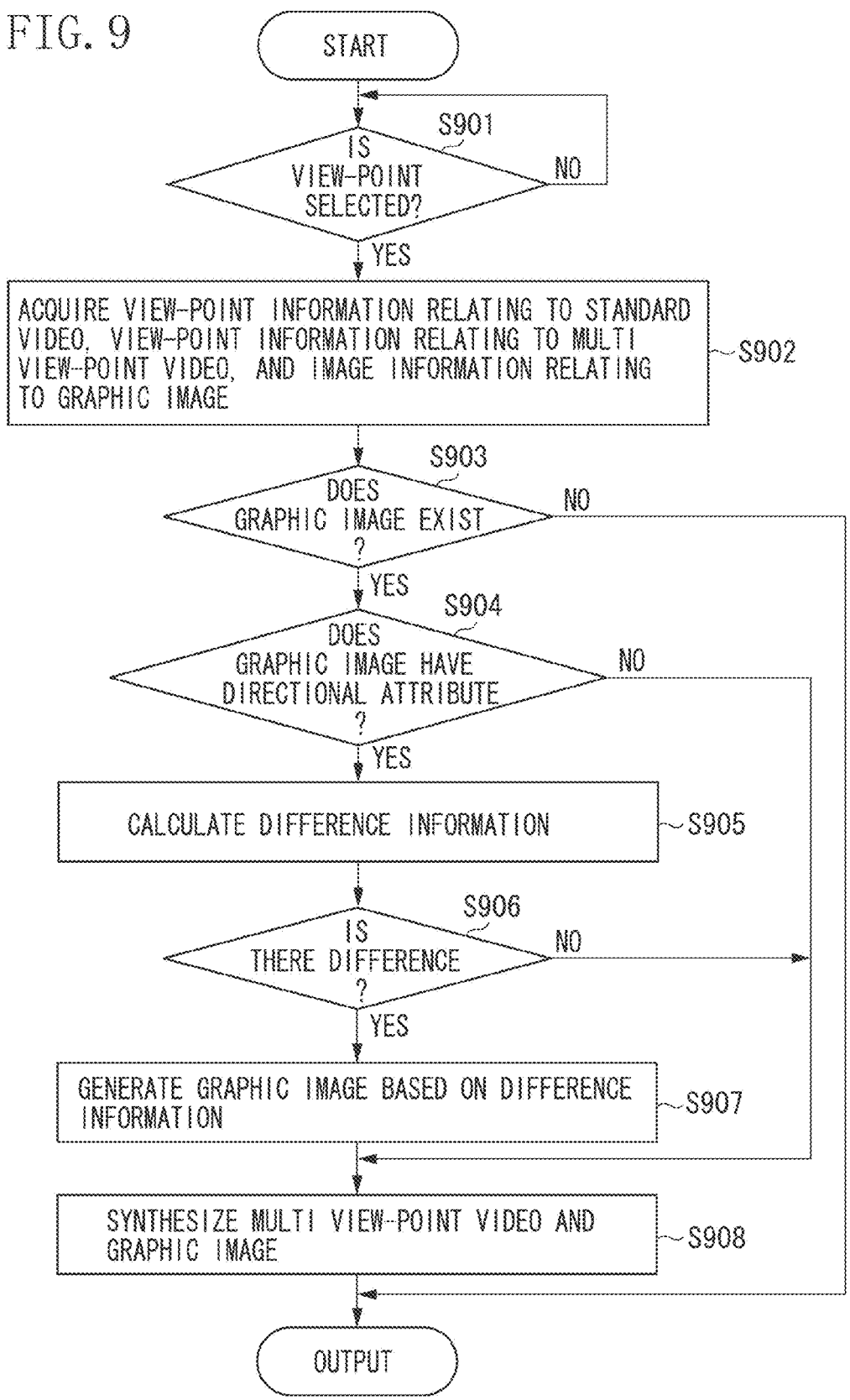

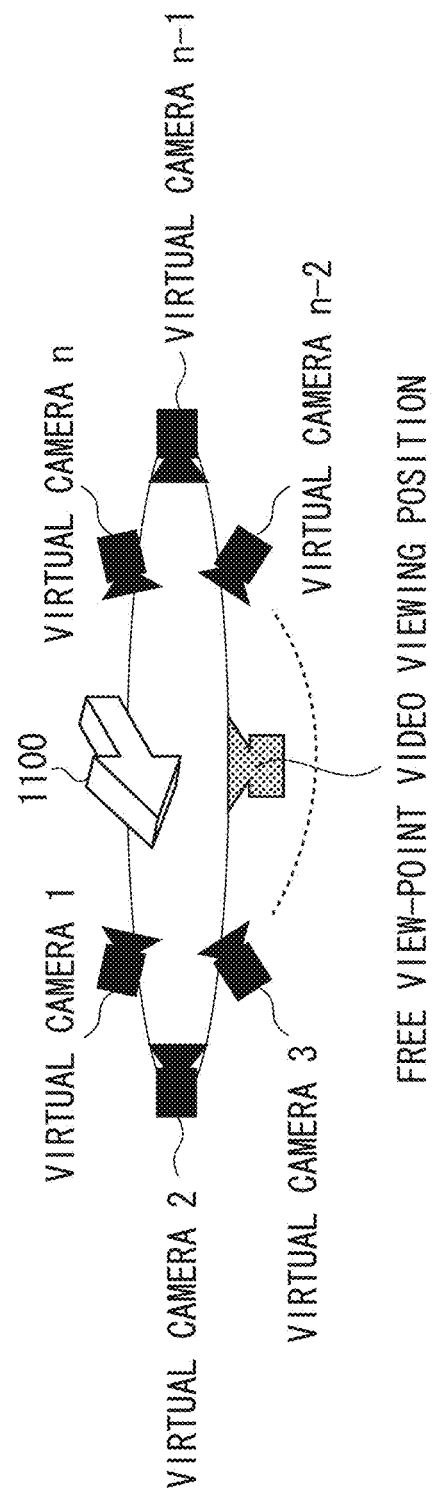

FIG. 13

| VIEW-POINT INFORMATION | | | GRAPHIC DISPLAY POSITION | GRAPHIC ENLARGEMENT RATE |
|---|---|---|---|---|
| VIEW-POINT POSITION | LINE-OF-SIGHT DIRECTION | VIEW ANGLE | | |
| $(X_1, Y_1, Z_1)$ | $(A_1, B_1)$ | $(\Gamma_1, \Theta_1)$ | $(a_1, b_1)$ | $L_1$ |
| ⋮ | ⋮ | ⋮ | ⋮ | ⋮ |
| $(X_n, Y_n, Z_n)$ | $(A_n, B_n)$ | $(\Gamma_n, \Theta_n)$ | $(a_n, b_n)$ | $L_n$ |

VIDEO PROCESSING APPARATUS CAPABLE OF REPRODUCING VIDEO CONTENT INCLUDING A PLURALITY OF VIDEOS AND CONTROL METHOD THEREFOR

BACKGROUND OF THE INVENTION

1. Field of the Invention

The present invention relates to a video processing apparatus capable of reproducing a video content including a plurality of videos and a control method therefor.

2. Description of the Related Art

We are currently in an era of full-scale digital broadcasting. Considerable research and development of various next-generation broadcasting systems have been performed. Research and development of a technique for compressing a video and transmitting a large amount of data have progressed, so that viewing formats such as a television program and a video content have been diversified.

One of the viewing formats is a free view-point video viewing system for transmitting a multi view-point video captured at a plurality of view-point positions and a free view-point video content generated based thereon.

In a free view-point video viewing system, a view-point video corresponding to a view-point position of a user's taste can be generated using video contents at a plurality of view-point positions.

Japanese Patent Application Laid-Open No. 2007-150747 discusses a technique seamlessly connecting, when a video transmission service of an existing broadcast or the like and a free view-point video service are provided in cooperation, a view-point and a line-of-sight in switching from a standard video to a free view-point video of a broadcast program.

On the other hand, there has been a technique for synthesizing description information such as a caption with a video. In the above-mentioned free view-point video system, a video to be displayed is generated according to a view-point selected by a user. Therefore, it is difficult for a video producer to predict previously a view-point that is selected by a user, and synthesize corresponding description information with the selected view-point.

Japanese Patent Application Laid-Open No. 2007-215097 discusses a technique for detecting an object within a free view-point video and displaying a caption based on a layout template having a condition that matches feature information relating to the object.

However, consider a case where a graphic image indicated by an arrow representing a wind direction is synthesized as description information to correspond to a standard video, for example, as illustrated in FIG. 14A. If a graphic image indicated by an arrow, similarly to that illustrated in FIG. 14A, is also synthesized in a video illustrated in FIG. 14B that differs in view-point position from a standard video, different information from the original one is presented.

Conventionally, the graphic image to be synthesized with the video cannot be provided in a display format suitable for a view-point video selected by a user, although to be changed depending on a view-point position and a line-of-sight direction.

SUMMARY OF THE INVENTION

According to an aspect of the present invention, an apparatus capable of reproducing a video content including a plurality of videos includes an acquisition unit configured to acquire first view-point information relating to a first video, second view-point information relating to a second video, and image information used to generate a graphic image corresponding to the first video, a calculation unit configured to calculate difference information between the first and the second view-point information, a generation unit configured to convert the image information using the difference information, and generate a graphic image corresponding to the second video based on the converted image information, and a synthesis unit configured to synthesize the generated graphic image and an image of the second video.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart for generating a graphic image suitable for a free view-point video.

FIG. 5 is a schematic diagram illustrating a method for calculating difference information.

FIG. 8 is a block diagram illustrating a schematic configuration of a video processing apparatus according to a second exemplary embodiment of the present invention.

FIG. 9 is a flowchart for generating a graphic image suitable for a multi view-point video.

FIG. 11 illustrates a relationship between cameras of a free view-point generating video and a graphic image.

FIG. 13 illustrates a display information table according to a fourth exemplary embodiment of the present invention.

DESCRIPTION OF THE EMBODIMENTS

Various exemplary embodiments, features, and aspects of the invention will be described in detail below with reference to the drawings.

In the present exemplary embodiment, a television receiving apparatus is taken as an example of a video processing apparatus, and will be described with a configuration in which a standard video of a broadcast program is received from a digital broadcast signal, and free view-point generating videos captured at a plurality of view-point positions relating to the standard video are acquired via the Internet.

The standard video refers to a main video in the existing broadcast program. A method for and a path for acquiring the standard video and the free view-point generating video are not limited to a method and a path described in the present exemplary embodiment. They may be a method and a path capable of acquiring similar videos.

Figure 1:
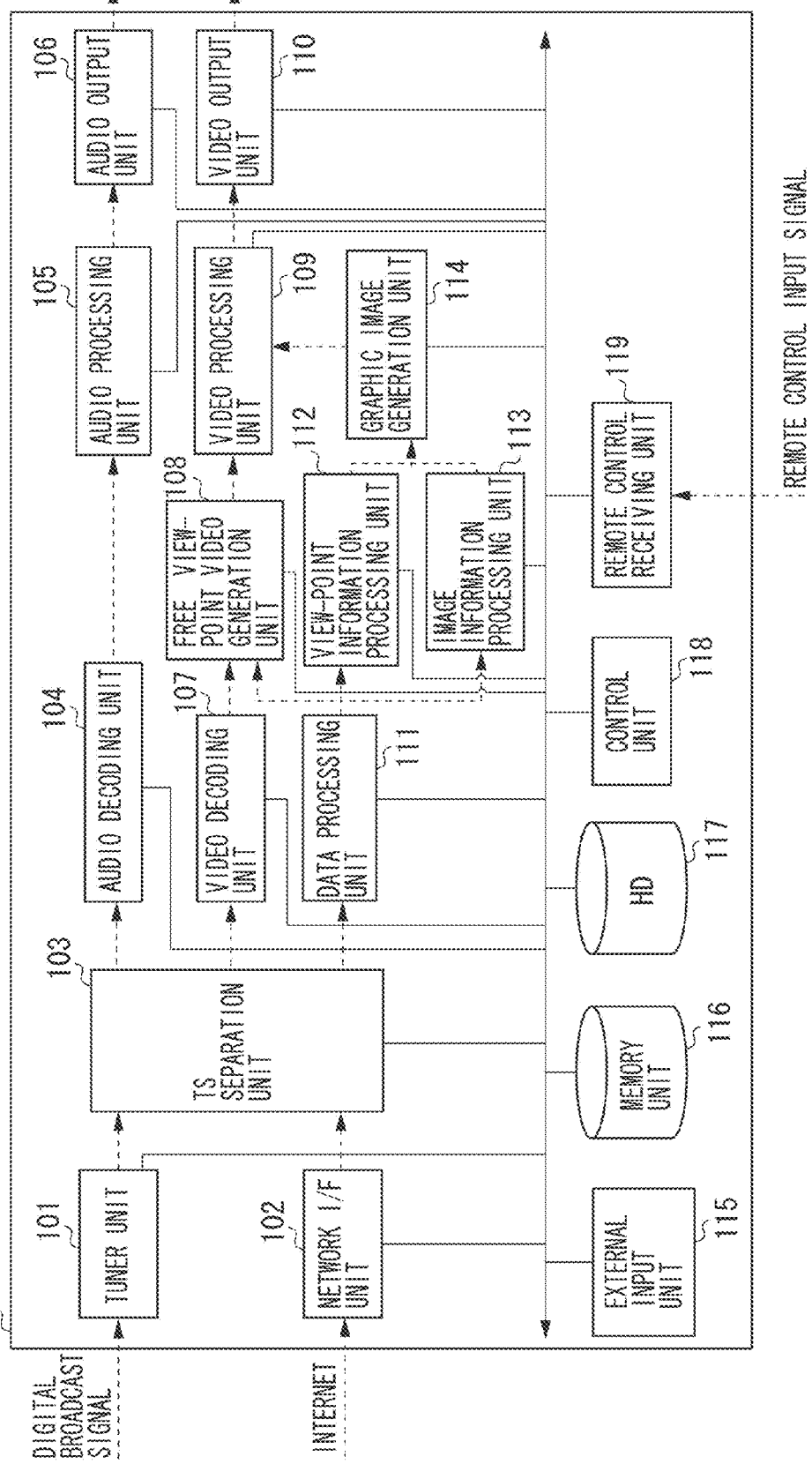
FIG. 1 is a block diagram illustrating a schematic configuration of a video processing apparatus according to a first exemplary embodiment of the present invention.

FIG. 1 is a block diagram illustrating a schematic configuration of a video processing apparatus according to a first exemplary embodiment of the present invention.

A video processing apparatus 100 includes a free view-point video generation unit 108, a video processing unit 109, a view-point information processing unit 112, an image information processing unit 113, and a graphic image generation unit 114 in addition to a normal configuration of the television receiver. Functional blocks constituting the video processing apparatus 100 are respectively connected to each other by internal buses, operate by a control signal of a control unit 118, and send and receive data to and from each other.

A tuner 101 receives a digital broadcast signal in response to a control instruction from the control unit 118, and extracts content data (TS data) of a standard video, in which a video and an audio are multiplexed, obtained by performing demodulation processing.

A network interface (I/F) unit 102 acquires content data of a free view-point generating video via a network. Content data input from the tuner unit 101, the network I/F unit 102, or an external input unit 115 is downloaded in a file format, and is stored in a memory unit 116 or a hard disk (HD) 117.

The stored content data is read out of the memory unit 116 or the HD unit 117 in response to a control instruction output from the control unit 118, and is output to a transport stream (TS) separation unit 103.

When the content data is displayed in a streaming format, it is output to the TS separation unit 103 from the tuner unit 101, the network I/F unit 102, or the external input unit 103.

The TS separation unit 103 takes out audio stream data, video stream data, and various types of data required for content display from the input content data and separate the data. The video stream data and the audio stream data are data in a Motion Picture Experts Group (MPEG) format defined in Association of Radio Industries and Business (ARIB).

The audio stream data, which has been separated by the TS separation unit 103, is decoded by an audio decoding unit 104, and is subjected to audio processing of sound quality and realistic sensation, and volume adjustment processing by an audio processing unit 105. The audio processing unit 105 outputs processed audio data to an audio output unit 106, and the audio output unit 106 further outputs the audio data to a speaker or the like.

A video decoding unit 107 decodes video stream data, which has been separated by the TS separation unit 103. The video stream data includes standard video data and free view-point generating video data. The decoded video stream data is output to a free view-point video generation unit 108.

The various types of data required for content display, which has been separated by the TS separation unit 103, is output to a data processing unit 111. The various types of data required for content display includes view-point information relating to a standard video, view-point information relating to a free view-point generating video, and image information relating to a graphic image to be synthesized to make a video visually understandable to correspond to the standard video. The graphic image refers to an image indicated by an arrow representing a direction of wind in a video, for example.

While the view-point information and the image information are acquired via the Internet, and are stored in the memory unit 116 or the HD 117 in the present exemplary embodiment, they need not be limited to the acquiring method and path described in the present exemplary embodiment. For example, they may be a method and a path capable of acquiring similar information. Details of the view-point information and the image information will be described in detail below.

The data processing unit 111 outputs view-point information relating to a free view-point generating video, view-point information relating to a standard video, and image information relating to a graphic image, respectively, to the view-point video generation unit 108, the view-point information processing unit 112, and the image information processing unit 113, respectively.

The free view-point video generation unit 108 generates free view-point video data according to a control instruction from the control unit 118 corresponding to a signal from the remote control receiving unit 119 including view-point information relating to a free view-point video selected by a user based on the free view-point video data.

As to a method for generating a free view-point video, a known technique such as a method for generating free view-point information using information such as a camera position and an angle of view of a standard video in a broadcast program, to obtain a corresponding free view-point video can be used.

For example, a free view-point video is generated by synthesizing a video at a free view-point position from a plurality of multi view-point videos that differ in view-point positions. In this case, the video decoding unit 107 can simultaneously decode a plurality of video stream data. Generated free view-point video data is output to the video processing unit 109.

The view-point information processing unit 112 calculates a difference between view-point information relating to a standard video and view-point information relating to a free view-point video acquired from the control unit 118 that has received a signal from a remote control receiving unit 119. The calculated difference information is output to the graphic image generation unit 114.

The image information processing unit 113 determines whether the graphic image has a directional attribute and differs in a display format depending on a view-point position and a line-of-sight direction using the image information relating to the graphic image that has been acquired from the data processing unit 111.

The graphic image generation unit 114 generates a graphic image to be superimposed on a free view-point video to be output, and outputs the graphic image to the video processing unit 109 based on the difference information from the view-point information processing unit 112 and information relating to the presence or absence of the directional attribute from the image information processing unit 113.

The video processing unit 109 synthesizes the free view-point video from the free view-point video generation unit 108 and the graphic image from the graphic image generation unit 114, and outputs a synthesis result to a video output unit 110. The video output unit 110 outputs a video to be displayed on a display unit.

The control unit 118 performs processing corresponding to the signal from the remote control receiving unit 119, described below. The remote control receiving unit 119 receives a remote control signal output from a remote control for the video processing unit 100, and transfers the remote control signal to the control unit 118. The remote control signal includes the view-point information relating to the free view-point video selected by a user.

The control unit 118 outputs the view-point information relating to the free view-point video selected by the user to the free view-point video generation unit 108 and the view-point information processing unit 112.

A unit and a method for acquiring the view-point information relating to the free view-point video is not limited to the unit and method described above. For example, the view-point video is acquired from recommended view-point information designated from a television station.

FIG. 2 is a flowchart for generating a graphic image suitable for a free view-point video to be displayed when a user performs an operation for selecting a view-point of a free view-point video.

In step S201, the control unit 118 determines whether the remote control receiving unit 119 receives a signal obtained by selecting a view-point of a video by the user. If the view-point is selected (YES in step S201), the processing proceeds to step S202. In step S202, the view-point information processing unit 112 acquires view-point information relating to a standard video and view-point information relating to a free view-point video selected by the user.

In step S202, the image information processing unit 113 acquires image information relating to a graphic image. The view-point information processing unit 112 and the image information processing unit 113 may repeatedly acquire the view-point information and the image information at predetermined time intervals without using an operation for selecting a view-point by the user as a trigger.

In step S203, the control unit 118 then determines whether a graphic image exists in content data of a video to be displayed on the display unit. If the graphic image exists (YES in step S203), the processing proceeds to step S204. In step S204, the control unit 118 determines whether the graphic image has a directional attribute, and differs in a display format depending on a view-point position and a line-of-sight direction in the image information processing unit 113.

If the graphic image does not have a directional attribute (NO in step S204), the processing proceeds to step S208. In step S208, the control unit 118 causes the video processing unit 109 to synthesize the graphic image and a free view-point video to be output.

If the graphic image has a directional attribute (YES in step S204), the processing proceeds to step S205. In step S205, the control unit 118 directly calculates difference information between the view-point information relating to the standard video and the view-point information relating to the free view-point video in the view-point information processing unit 112. A method for calculating the difference information will be described below.

In step S206, the control unit 118 determines whether there is a difference between the view-point information relating to the standard video and the view-point information relating to the free view-point video as a result of calculating the difference information. If there is a difference between the view-point information (YES in step S206), the processing proceeds to step S207. In step S207, the graphic image generation unit 114 generates a graphic image based on difference information.

A method for generating a graphic image will be described below. In step S208, the video processing unit 109 synthesizes the free view-point video generated by the free view-point video and the graphic image. The video processing unit 109 outputs a synthesis result from the video output unit 110 to the display unit.

The view-point information relating to the standard video and the view-point information relating to the free view-point video include information for specifying a view-point position, a line-of-sight direction, and a view angle of a video. The view-point position of the video can be represented by position coordinates (x, y, z) using a certain point as a reference point.

While a reference point (0, 0, 0) is a position of an immobile object in the present exemplary embodiment, it can be optionally determined. For a video relating to an object that moves in a certain area, a center point of the area may be the reference point.

Figure 3A:
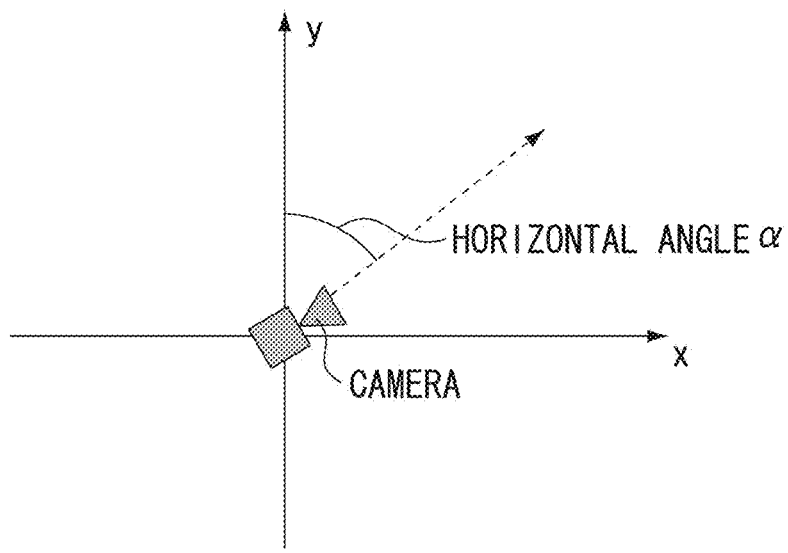
FIG. 3A is a schematic diagram illustrating a horizontal component of a line-of-sight direction.
Figure 3B:
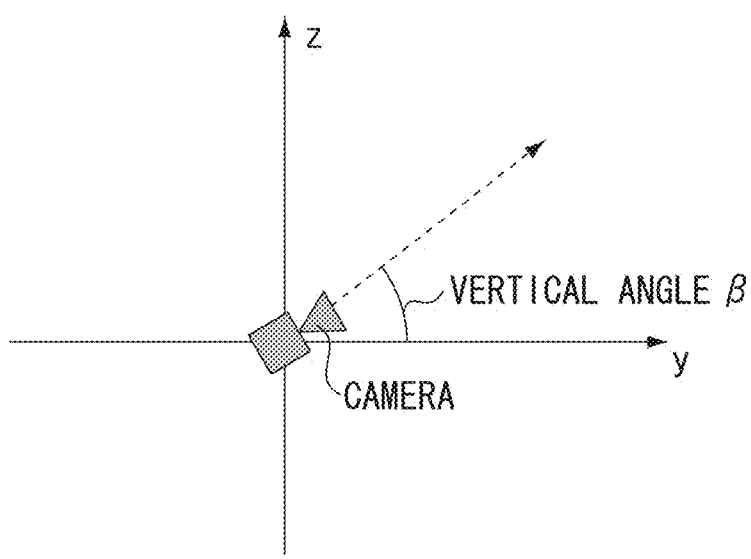
FIG. 3B is a schematic diagram illustrating a vertical component of a line-of-sight direction.

FIGS. 3A and 3B and FIGS. 4A and 4B are schematic diagrams illustrating a line-of-sight direction and a view angle. The line-of-sight direction corresponds to a video capturing direction. As illustrated in FIGS. 3A and 3B, and can be represented by angles of a horizontal component and a vertical component (a horizontal angle $\alpha$ and a vertical angle $\beta$).

In the present exemplary embodiment, a y-axis direction is an angle reference. A range of the horizontal angle $\alpha$ is $-180°$ to $180°$, and a range of the vertical angle $\beta$ is $-180°$ to $180°$. A reference direction may be selected in any method.

Figure 4A:
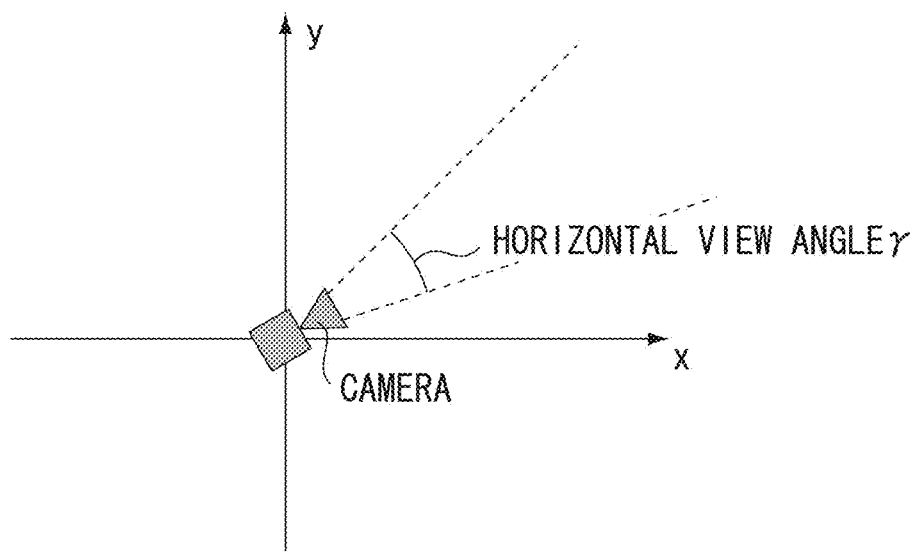
FIG. 4A is a schematic diagram illustrating a horizontal component of a view angle.
Figure 4B:
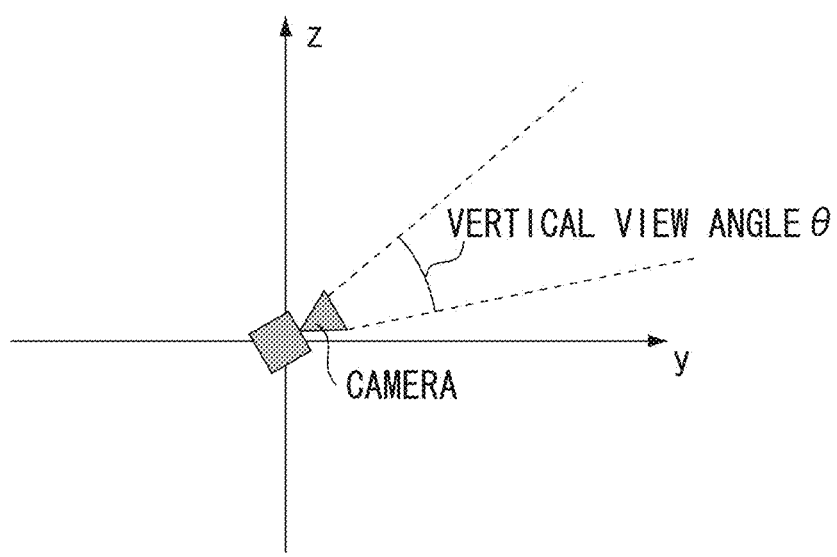
FIG. 4B is a schematic diagram illustrating a vertical component of a view angle.

The view angle can be represented by angles of a horizontal component and a vertical component (a horizontal view angle $\alpha$ and a vertical view angle $\beta$) in a range in which a video is displayed, as illustrated in FIGS. 4A and 4B. View-point information relating to a standard video and view-point information relating to a free view-point video may be in any format as long as they enable a view-point position, a line-of-sight direction, and a view angle of a video to be specified.

A method for calculating difference information between view-point information relating to a standard video and view-point information relating to a free view-point video will be described.

The difference information includes information relating to differences in parameters (a view-point position (x, y, z), a line-of-sight direction (a horizontal angle $\alpha$, a vertical angle $\beta$), and a view angle ((a horizontal view angle $\alpha$, a vertical view angle $\beta$) constituting each of the view-point information relating to the standard video and the free view-point video.

The difference in the view-point position is represented by a ratio of absolute values of distance between an object position serving as a reference point and a view-point position of a video. If the object position and the reference point differ from each other, coordinates of a position of an object are acquired, and an absolute value of a distance between the object position and a view-point position of a video may be used as a difference in the view-point position.

The difference in the sight-of-line direction is represented by a difference between angles representing sight-of-line directions of the standard video and the free view-point video. The difference in the view angle is represented by a ratio of view angles of the standard video and the free view-point video.

While a difference is acquired using view-point information relating to the standard video as a basis in the present exemplary embodiment, the basis may be selected in any method. View-point information relating to one of free view-point generating videos may be used as a basis. At this time, a graphic image corresponding to a video used as a basis exists.

FIG. 5 is a schematic diagram for illustrating a method for calculating difference information.

View-point information relating to a standard video includes a view-point position (x1, y1, z1), a line-of-sight direction ($\alpha 1$, $\beta 1$), and a view angle ($\gamma 1$, $\theta 1$) of a video using an object position as a reference position (0, 0, 0).

View-point information relating to a free view-point video includes a view-point position (x2, y2, z2), a view-point direction ($\alpha 2$, $\beta 2$), and a view angle ($\gamma 2$, $\theta 2$) of a video using a reference position as a basis, similarly to the view-point information relating to the standard video.

A difference in the view-point position is obtained by Equation 1 as difference information:

$$\sqrt{(x2)^2+(y2)^2+(z2)^2}/\sqrt{(x1)^2+(y1)^2+(z1)^2} \qquad 1$$

A difference in the line-of-sight direction is ($\alpha 2 - \alpha 1$, $\beta 2 - \beta 1$), and a difference in the view angle is ($\gamma 2/\gamma 1$, $\theta 2/\theta 1$).

Image information relating to a graphic image includes direction information and drawing information. The direction information in the present exemplary embodiment includes direction information "0" and direction information "1". The direction information "0" indicates that the graphic image does not have a directional attribute and does not differ in a display format depending on a view-point position or a line-of-sight direction. The direction information "1" indicates that the graphic image has a directional attribute and differs in a display format depending on a view-point position.

In step S204 illustrated in FIG. 2, the control unit 118 determines whether the graphic image has a directional attribute, and differs in a display format depending on a view-point position and a line-of-sight direction using the direction information. The direction information may be of any type if it enables determination whether the graphic image has a directional attribute.

The drawing information includes vertex coordinates (a, b, c) constituting a graphic image, vertex numbers, color information (R, G, B, transmittance), and others. In the present exemplary embodiment, the vertex coordinates, for example, in the drawing information correspond to each of the vertex numbers, and takes a value from –100 to 100 using a local coordinate system.

The vertex number is any number assigned to a vertex constituting a figure of a graphic image. The drawing information also includes information relating to a vertex, a line segment, and a surface constituting the figure of the graphic image.

In the present exemplary embodiment, the line segment is represented by (X, Y) using vertex numbers X and Y of two vertexes connected to each other by a line, and the surface is represented by (A, B, C, D) using vertex numbers A, B, C, and D of vertexes constituting a plane.

Figure 6:
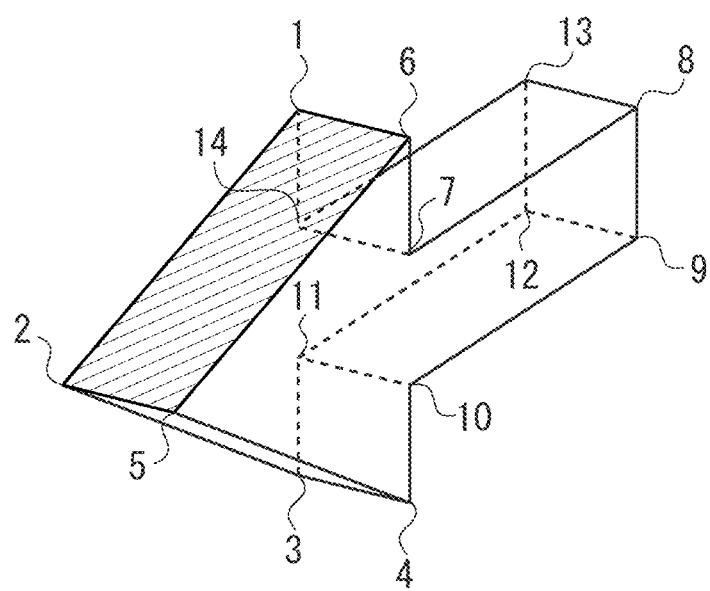
FIG. 6 illustrates an example of a graphic image representing a wind direction.

For example, a figure of a graphic image representing a wind direction illustrated in FIG. 6 includes vertex numbers 1 to 14, 21 line segments, and nine surfaces, and a surface indicated by a diagonal line is a surface (1, 2, 5, 6) including four line segments (1, 2), (2, 5), (5, 6), and (6, 1). Color information representing a line segment and a surface determines a color using RGB lightness encoded by 24 bit per pixel (bpp). More specifically, R, G, and B have numerical values 0 to 255.

Furthermore, the transmittance takes a value from 0 to 100, so that the transmission of a color can be adjusted. The drawing information may be of any type if it enables a desirable graphic image to be generated. A graphic image representing a wind direction is to be generated depending on a view-point position and a line-of-sight direction. Therefore, the direction information is 1.

A method for generating a graphic image in the graphic image generation unit 114 will be described. In the present exemplary embodiment, a graphic image corresponding to a free view-point video is generated from a graphic image corresponding to a standard video using the difference information calculated by the view-point information processing unit 112.

More specifically, the graphic image corresponding to the standard video is rotated by an angle corresponding to a difference in a line-of-sight direction between the standard video and the free view-point video so that a graphic image corresponding to the free view-point video can be generated.

Image information relating to the graphic image corresponding to the standard video is converted using an affine transformation, for example, so that image information relating to a graphic image corresponding to a free view-point video can be obtained.

The graphic image is not only rotated using a difference in a line-of-sight direction between a standard video and a free view-point video but also enlarged and reduced using differences in a view-point position and a difference in a view angle between a standard video and a free view-point video.

For example, the graphic image is displayed in a reduced manner not to prevent video viewing when a video that has come closer to an object than a standard video as a free view-point video, and is displayed in an enlarged manner when a video moves farther away from the object. When a video that has come closer to the object, a graphic image enlarged depending on an enlargement rate of the object may be displayed to represent a feeling of distance from the object.

While the graphic image can be enlarged and reduced using an affine transformation, like when it is rotated, the affine transformation may be of any type if it enables the graphic image to be enlarged, reduced, and rotated.

Furthermore, respective display areas in a standard video and a free view-point video are 3D-mapped using view-point information relating to the standard video and the free view-point video, and it can be determined whether similar places are captured or different places are captured from a ratio of a portion where the display areas overlap each other.

It is determined that the free view-point video captures a place different from that captured by the standard video as a result of the determination, it is also possible to perform control not to display the graphic image.

It can be determined whether a graphic image is displayed in the free view-point video depending on whether a reference point of a view-point position of a video or a particular point of an object position or the like is included in a display area of the free view-point video.

While a graphic image corresponding to the free view-point video is generated based on image information relating to a graphic image corresponding to the standard video in the present exemplary embodiment, a graphic image corresponding to the free view-point video may be generated based on image information relating to a graphic image corresponding to each free view-point generating video.

It is also assumed that image information relating to a plurality of graphic images corresponding to a plurality of free view-point generating videos are assigned to the free view-point generating video.

In a similar process to a process for respectively generating graphic images corresponding to a plurality of free view-point generating videos and generating a free view-point video, for example, the graphic image corresponding to the free view-point video may be generated from the generated plurality of graphic images.

The graphic image corresponding to the free view-point video obtained in the above-mentioned manner is generated in the graphic image generation unit 114 based on image information relating to the graphic image corresponding to the free view-point video.

Figure 7A:
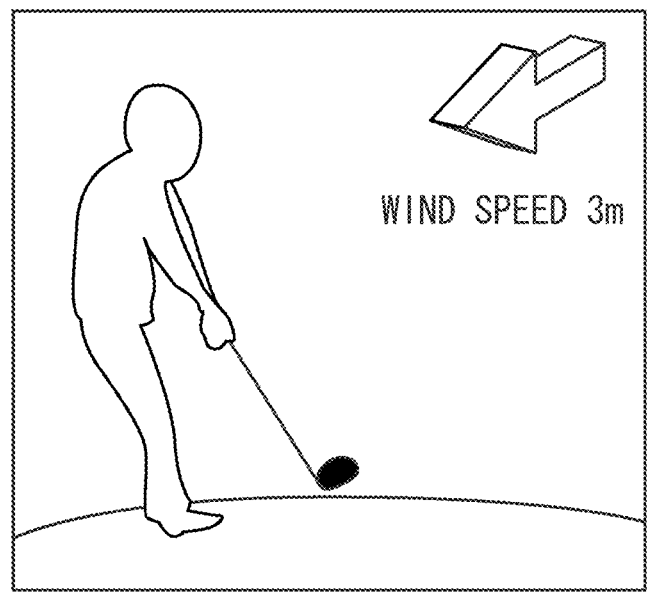
FIG. 7A illustrates an example of a graphic image corresponding to a view-point position and a line-of-sight direction of a video before switching according to the present exemplary embodiment.
Figure 7B:
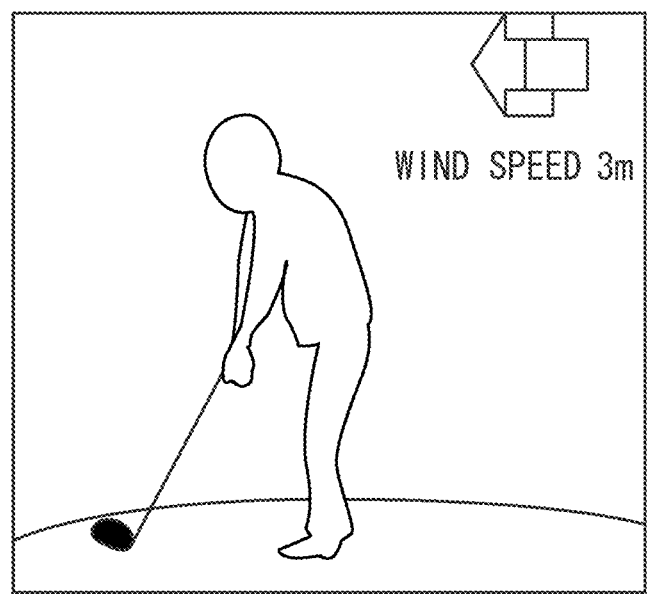
FIG. 7B illustrates an example of a graphic image corresponding to a view-point position and a line-of-sight direction of a video after switching according to the present exemplary embodiment.

When the generated graphic image is synthesized with the free view-point video, a display format of a graphic image representing a wind direction at the upper right of a video changes depending on a view-point position and a line-of-sight direction of the video in switching from a video at the right of an object illustrated in FIG. 7A to a video at the left of an object illustrated in FIG. 7B.

Therefore, according to the first exemplary embodiment, a graphic image to be changed depending on the view-point position and the line-of-sight direction can be provided in a display format suitable for a video selected by the user.

A second exemplary embodiment of the present invention will be described below. In the present exemplary embodiment, a standard video of a broadcast program is received as a digital broadcast signal, and a multi view-point video including video data captured at a plurality of view-point positions is acquired via the Internet.

The multi view-point video includes a plurality of video data, which differ in view-point positions, reproducible in synchronization with one another, for example, a plurality of video data that is captured in synchronization with a plurality of cameras surrounding an object. A user can select a plurality of view-points with a remote controller or the like, and can view a video captured from the selected view-point.

A method and a path for acquiring a standard video and a multi view-point video are not to be limited to the method and the path in the present exemplary embodiment. They may be a method and a path capable of acquiring similar videos. In the present exemplary embodiment, description of similar portions to those in the first exemplary embodiment is omitted or simplified.

FIG. 8 is a block diagram illustrating a schematic configuration of a video processing apparatus 800 according to the second exemplary embodiment of the present invention.

The video processing apparatus 800 includes an audio selection unit 801 and a video selection unit 802, unlike the first exemplary embodiment. The video processing apparatus 800 acquires content data relating to a standard video and a multi view-point video from a tuner 101, a network I/F unit 102, or an external input unit 115, like the first exemplary embodiment. The acquired content data is downloaded in a file format, and is stored in a memory unit 116 or a HD 117.

A TS separation unit 103 reads out the content data stored in the memory unit 116 or the HD 117 in response to a control instruction from a control unit 118, and extracts audio stream data, video stream data, and various types of data required for content display.

Data to be extracted by the TS separation unit 103 and to be processed by a data processing unit 111 includes at least three information, i.e., view-point information relating to the standard video, view-point information relating to the multi view-point video, and image information relating to a graphic image. The view-point information relating to the multi view-point video includes information for specifying a view-point position, a line-of-sight direction, and a view angle of a video, similarly to the view-point information relating to the standard video in the first exemplary embodiment.

The view-point information and the image information are acquired via the Internet, and is stored in the memory unit 116 or the HD 117. A method and a path for acquiring view-point information and image information are not to be limited to the configuration of the present exemplary embodiment, and may be a method and a path capable of acquiring similar information, like those in the first exemplary embodiment.

The audio selection unit 801 and the video selection unit 802 respectively select audio stream data and video stream data in response to the control instruction from the control unit 118 that has received a signal from a remote control receiving unit 119, and output the audio stream data and the video stream data to an audio processing unit 105 and a video processing unit 109.

A view-point information processing unit 112 calculates a difference between view-point information relating to a standard video and view-point information relating to multi view-point video data selected by the user. The calculated difference information is output to a graphic image generation unit 114.

The control unit 118 performs processing corresponding to a remote control signal by the user received from the remote control receiving unit 119. The remote control signal includes information relating to a multi view-point video selected by the user, and the control unit 118 outputs the view-point information relating to the multi view-point video selected by the user to the audio selection unit 801, the video selection unit 802, and the view-point information processing unit 112.

A path and a method for acquiring the view-point information relating to the multi view-point video is not limited to those described above. For example, they may be acquired from recommended view-point information designated from a television station.

A flowchart for generating a graphic image suitable for a multi view-point video to be displayed when a view-point of the multi view-point video is selected will be described with reference to FIG. 9.

In step S901, the control unit 118 determines whether the remote control receiving unit 119 has received a signal for selecting a view-point of a video by the user.

If an instruction to select the view-point is received (YES in step S901), the processing proceeds to step S902. In step S902, the view-point information processing unit 112 and the image information processing unit 113 acquire view-point information relating to a standard video, view-point information relating to a multi view-point video selected by the user, and image information relating to a graphic image.

At this time, the view-point information processing unit 112 and the image information processing unit 113 may repeatedly acquire the view-point information and the image information at predetermined time intervals without using the instruction to select a view-point by the user as a trigger.

In step S903, the control unit 118 determines whether a graphic image exists in a video to be displayed on a display unit. If the graphic image exits (YES in step S903), the processing proceeds to step S904. In step S904, the control unit 118 determines whether the graphic image has a directional attribute, and differs in a display format depending on a view-point position in the image information processing unit 113.

If the graphic image has the directional attribute (YES in step S904), the processing proceeds to step S905. In step S905, the control unit 118 calculates difference information between the view-point information relating to the standard video and view-point information relating to the multi view-point video. A calculation method may be a similar to that in the first exemplary embodiment, or may be acquired from meta data or the like previously assigned to a video.

If there is a difference between the view-point information relating to the standard video and the view-point information relating to the multi view-point video (YES in step S906), the processing proceeds to step S907. In step S907, the control unit 118 generates a graphic image based on the difference information. A method for generating a graphic image is similar to that in the first exemplary embodiment.

In step S908, the control unit 118 synthesizes the multi view-point video to be displayed and the graphic image in the video processing unit 109. The control unit 118 outputs a synthesis result from the video output unit 110 to the display unit.

Even when the multi view-point video is viewed, if the graphic image is generated, and is synthesized with the multi view-point video, as described above, a display format of the graphic image changes depending on a view-point position and a line-of-sight direction of the selected multi view-point video. The graphic image to be changed depending on the view-point position and the line-of-sight direction can be provided in a display format suitable for the view-point video selected by the user.

A third exemplary embodiment of the present invention will be described below. In the present exemplary embodiment, a configuration in which a free view-point video corresponding to an instruction to select a view-point by a user, which has been acquired via the Internet, is generated in a server that distributes a video content will be described below.

A video generation apparatus for generating a free view-point video includes a network I/F unit 102, a free view-point video generation unit 108, a video processing unit 109, and a video output unit 110 illustrated in FIG. 1. The video generation apparatus further includes a view-point information processing unit 112, an image information processing unit 113, a graphic image generation unit 114, a memory unit 116, a HD 117, a control unit 118, and a remote control receiving unit 119.

The network I/F unit 102 receives a signal from a content reproduction apparatus that has received an instruction to select a view-point by the user via the Internet. The free view-point video generation unit 108 generates a free view-point video corresponding to a view-point selected by the user using free view-point generating video data.

A graphic image corresponding to the generated free view-point video is generated according to the flowchart illustrated in FIG. 2, like in the first exemplary embodiment, and is synthesized with the free view-point video. The synthesized free view-point video is sent from the video output unit 110 to the content reproduction apparatus of the user who has selected the view-point via the Internet.

Therefore, according to the third exemplary embodiment, a graphic image to be changed depending on a view-point position and a line-of-sight direction without applying load to the content reproduction apparatus can be provided in a display format suitable for a video selected by the user.

A fourth exemplary embodiment will be described below. The present exemplary embodiment will be described for a configuration in which free view-point generating videos are captured at a plurality of view-point positions via the Internet.

A method and a path for acquiring the free view-point generating video are not limited to the method and the path according to the present exemplary embodiment. They may be a method and a path in which a similar video can be acquired. In the description of the present exemplary embodiment, description of similar portions to those in the first exemplary embodiment is not repeated or is simplified.

A video generation apparatus for generating a free view-point video in the present exemplary embodiment is similar to that illustrated in FIG. 1. In the first to third exemplary embodiments, a graphic image corresponding to a free view-point video is generated from a graphic image corresponding to a standard video.

On the other hand, in the present exemplary embodiment, a graphic image corresponding to a free view-point video is generated from a plurality of graphic images respectively corresponding to a plurality of free view-point generating videos for generating a free view-point video.

A plurality of graphic images respectively corresponding to a plurality of free view-point generating videos are acquired via the Internet, similarly to the free view-point generating video.

A free view-point video generating unit 108 illustrated in FIG. 1 generates free view-point video data in response to a control instruction from a control unit 118 corresponding to a signal from a remote control receiving unit 119 including view-point information relating to a free view-point video selected by a user based on free view-point generating video data (first generation means).

A view-point information processing unit 112 acquires view-point information relating to each free view-point generating video and a graphic image corresponding to the free view-point generating video from a data processing unit 111. Further, the view-point information processing unit 112 acquires view-point information relating to a free view-point video from the control unit 118 that has received a signal from the remote control receiving unit 119.

An image information processing unit 113 determines whether the graphic image has a directional attribute using image information relating to the graphic image corresponding to the free view-point generating video. A graphic image generation unit 114 generates a graphic image corresponding to the view-point information relating to the free view-point video acquired by the view-point information processing unit 112 when the image information processing unit 113 determines that the graphic image has a directional attribute (second generation means).

As described above, the view-point information processing unit 112, the image information processing unit 113, and the graphic image generation unit 114 may generate the graphic image corresponding to the free view-point video. Alternatively, the free view-point video generation unit 108 may generate a graphic image corresponding to the free view-point video.

A plurality of graphic images respectively corresponding to a plurality of free view-point generating videos will be first described. In the present exemplary embodiment, a graphic image representing a wind direction is used as a graphic image to be synthesized with a free view-point video is also used.

Figure 10:
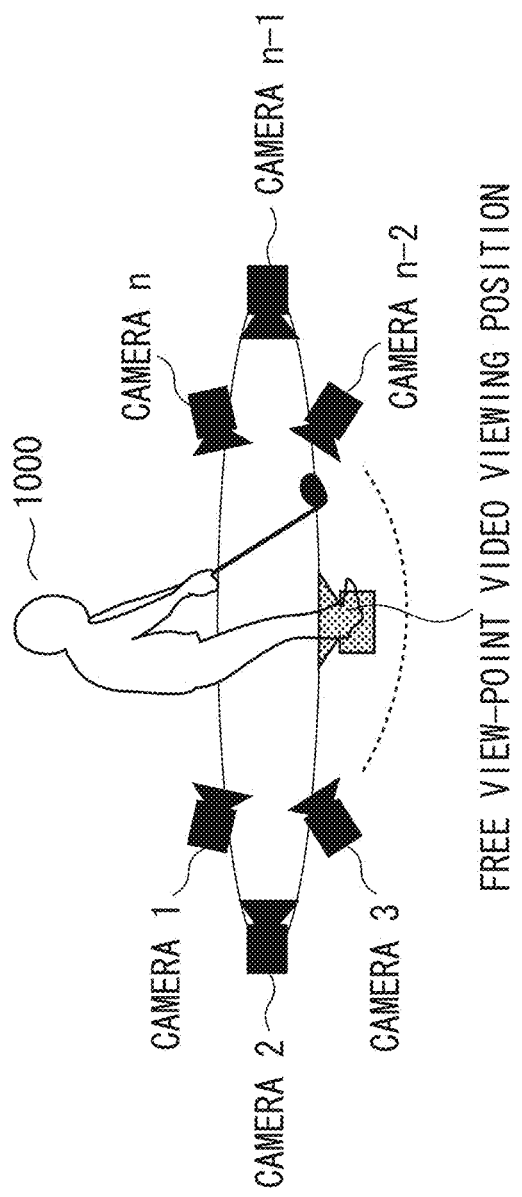
FIG. 10 illustrates a state where a free view-point generating video is captured.

FIG. 10 illustrates a state where a free view-point generating video is captured, and FIG. 11 illustrates a relationship between a camera for capturing the free view-point generating video illustrated in FIG. 10 and a graphic image.

Cameras (cameras 1 to n) capture the free view-point generating video surround an object 1000, as illustrated in FIG. 10. As illustrated in FIG. 11, a graphic image corresponding to the free view-point generating video is a graphic image 1100, which represent a wind direction viewed from n virtual cameras respectively corresponding to the n cameras illustrated in FIG. 10.

A positional relationship between the n cameras illustrated in FIG. 10 and the object 1000 and a positional relationship between the n virtual cameras illustrated in FIG. 11 and a three-dimensional graphic image 1100 correspond to each other. A space where the three-dimensional graphic image 1100 is taken as an object is hereinafter referred to as a graphic generation space.

Accordingly, the video processing apparatus acquires a plurality of graphic images respectively corresponding to a plurality of free view-point generating videos thus generated, together with the free view-pint generating video, via the Internet.

A method for generating a graphic image corresponding to a free view-point video will be described below. A graphic image corresponding to a free view-point video is generated using the plurality of graphic images respectively corresponding to the plurality of free view-point generating videos. In the present exemplary embodiment, a method for generating a graphic image using a light ray space method will be described.

Figure 12A:
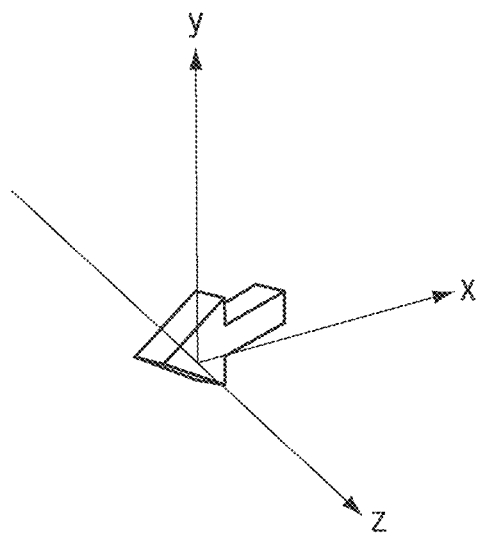
FIG. 12A illustrates an XYZ coordinate system of a graphic generation space.
Figure 12B:
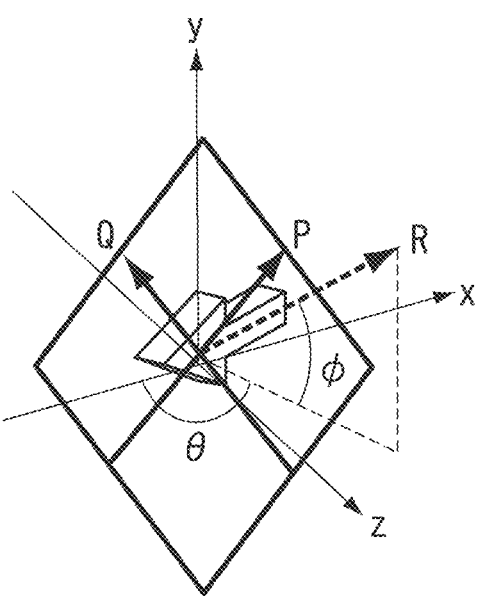
FIG. 12B illustrates a PQR coordinate system for recording light ray information.
Figure 14A:
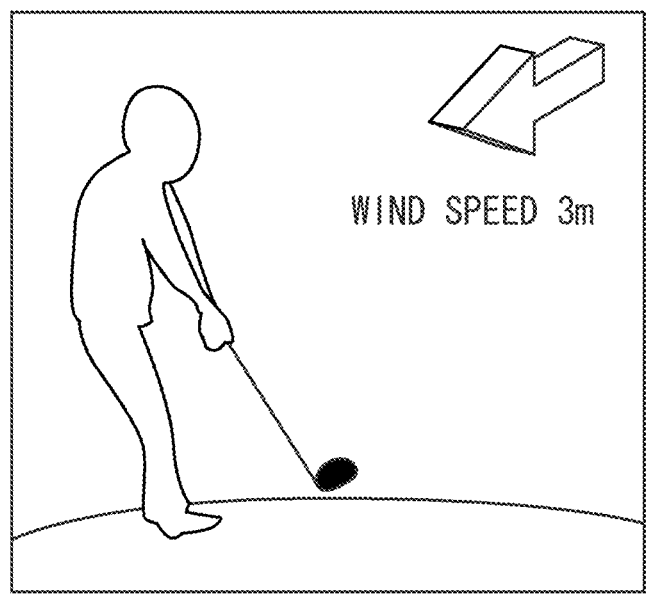
FIG. 14A illustrates an example of a graphic image to be synthesized with a video.
Figure 14B:
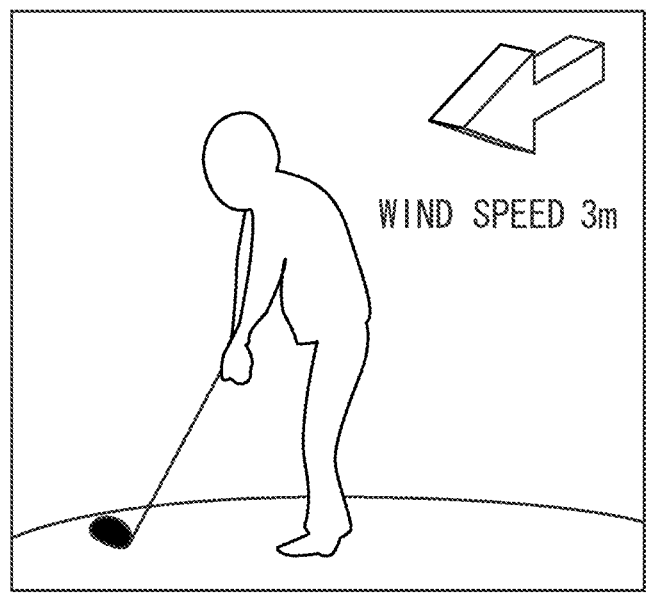
FIG. 14B illustrates an example of a graphic image to be synthesized with a video after switching when conventional technique is used.

As illustrated in FIG. 12A, an XYZ coordinate system is set up in a graphic generation space. As illustrated in FIG. 12B, a PQR coordinate system, which is converted by rotating the X, Y, and Z axis by $\phi$ degrees around an X-axis after rotating thereof by $\theta$ degrees around a Y-axis, is set.

An R-axis indicates a direction in which a light ray travels. At this time, light ray information in a real space is obtained by Equation 2. Light ray information is represented by Equation 3 when projected onto a PQ plane after the XYZ coordinate system is converted into the PQR coordinate system.

$$f(P,Q,R,\theta,\phi) \quad\quad 2$$

$$f(P,Q,\theta,\phi) \quad\quad 3$$

A position vector a of a point A (Xa, Ya, Za) in the graphic generation space is obtained by Equation 4, where respective unit vectors of P, Q, and R axes are p, q, and r:

$$a=Pp+Qq+Rr \quad\quad 4$$

The unit vector of the P axis, the unit vector of the Q axis, and the unit vector of the R axis are respectively obtained by Equation 5, Equation 6, and Equation 7:

$$p=(\cos\theta, 0, -\sin\theta)^T \quad\quad 5$$

$$q=(-\sin\theta\sin\phi, \cos\phi, -\cos\theta\sin\phi)^T \quad\quad 6$$

$$r=(\sin\theta\cos\phi, \sin\phi, \cos\theta\sin\phi)^T \quad\quad 7$$

When P and Q are represented by Xa, Ya, and Za by substituting Equations 5, 6, and 7 into Equation 4, Equations 8 and 9 are obtained:

$$P=Xa\cos\theta-Za\sin\theta \quad\quad 8$$

$$Q=-Xa\sin\theta\sin\phi+Ya\cos\phi-Za\cos\theta\sin\phi \quad\quad 9$$

Information relating to a light ray that passes through a point A (Xa, Ya, Za) on a graphic generation space XYZ is obtained by reading out light ray information f (P, Q, $\theta$, $\phi$) recorded at a position (P, Q) calculated from equations 9 and 10.

Image capturing by a camera corresponds to an operation for receiving a light ray that passes through a lens focal point of the camera and imaging the brightness and the color thereof. More specifically, it is synonymous with obtaining a group of light rays that pass through a focal position in the real space, which corresponds to the number of pixels, as an image. Therefore, light ray information is read out at a free view-point position in the real space, so that an image can be obtained.

The same holds true for the graphic generation space. Therefore, a graphic image that is displayed in an accurate direction is generated in a free view-point video at a free view-point position selected by the user from the above-mentioned processing.

A method for determining display coordinates and a display size of the generated graphic image will be described below.

In the present exemplary embodiment, image information relating to the graphic image includes a display information table in place of the direction information in the first exemplary embodiment. FIG. 13 illustrates the display information table used in the present exemplary embodiment. The display information table includes a view-point position, a line-of-sight direction, a view angle, a graphic display position, and a graphic enlargement rate.

First, a view-point position, a line-of-sight direction, and a view angle of a free view-point video designated by a control instruction from a user are compared with a view-point position, a line-of-sight direction, and a view angle in the display information table.

A graphic image is then arranged at a graphic display position in the display information table, to which a comparison result is the closest. The graphic display position is a position within a free view-point video in which a centroid of the generated graphic image is arranged, and a coordinate system is an xy coordinate system using the lower left of a free view-point video at a free view-point position selected by the user as an origin. While the center of gravity of the generated graphic image is arranged at the graphic display position in the present exemplary embodiment, the present invention is not limited to this.

The graphic image is then enlarged and reduced using a graphic enlargement rate. The graphic enlargement rate in the present exemplary embodiment is given as an integer of one or more. The graphic image is not enlarged and reduced when the graphic enlargement rate is 100, is enlarged two times when it is 200, and is reduced by half when it is 50. The graphic image itself is not displayed when the graphic enlargement rate is zero.

Display coordinates and display size of the graphic image generated as described above are determined.

In the present exemplary embodiment, graphic image data generated using light information relating to a light ray that passes through a view-point position of a free view-point video in the graphic generation space illustrated in FIG. 11 is synthesized with a free view-point video at a view-point position within a real space corresponding to the view-point position of the free view-point video within the graphic generation space. A composite video is as illustrated in FIG. 7A.

While a free view-point video and a graphic image are generated using a method referred to as a light ray space method in the present exemplary embodiment, the type of the method is not limited thereto if the free view-point video and the graphic image can be generated.

As described above, a graphic image corresponding to a free view-point video is generated from a plurality of graphic images respectively corresponding to a plurality of free view-point generating videos for generating a free view-point video. Accordingly, the graphic image to be changed depending on a view-point position and a line-of-sight direction can be provided in a display format suitable for a video selected by a user.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-288825 filed Dec. 21, 2009, which is hereby incorporated by reference herein in its entirety.

What is claimed is:

1. An apparatus comprising:
a processor; and
a memory coupled to the processor, the memory having instructions that, when executed by the processor, cause the processor to function as:
an acquisition unit which acquires first view-point information relating to a first video, second view-point information relating to a second video, and image information to be used to generate a graphic image corresponding to the first video;
a calculation unit which calculates difference information between the first and the second view-point information;
a first determination unit which determines whether a direction of a graphic image corresponding to the second video is to be rotated, in a direction different from a direction of the graphic image corresponding to the first video, according to a directional attribute that is information that the graphic image corresponding to the first video has;
a generation unit which converts the image information by using the difference information, in a case where the first determination unit determines that the direction of the graphic image corresponding to the second video is to be rotated in the direction different from the direction of the graphic image corresponding to the first video, and generates the graphic image corresponding to the second video based on the converted image information; and
a synthesis unit which synthesizes the generated graphic image and an image of the second video,
wherein the synthesis unit synthesizes the graphic image corresponding to the first video with the second video as the graphic image corresponding to the second video, in a case where the first determination unit determines that the direction of the graphic image corresponding to the second video is not to be rotated in the direction different from the direction of the graphic image corresponding to the first video, and
wherein the directional attribute is binary data indicating whether the direction of the graphic image corresponding to the first video differs in a display format depending on a view-point position or a line-of-sight direction.

2. The apparatus according to claim 1,
wherein the first and the second view-point information include at least information relating to line-of-sight directions or to view-point positions of the first video and the second video.

3. The apparatus according to claim 2,
wherein the calculation unit calculates an angle formed between the line-of-sight direction of the first video and the line-of-sight direction of the second video as difference information, and
wherein the generation unit rotates the graphic image corresponding to the first video by an angle represented by the calculated difference information to convert the image information, and generates the graphic image corresponding to the second video based on the converted image information.

4. The apparatus according to claim 2,
wherein the calculation unit calculates a difference in distance between the view-point position of the first video and the view-point position of the second video as difference information, and wherein the generation unit enlarges or reduces the graphic image corresponding to the first video depending on the difference in distance represented by the calculated difference information, to convert the image information, and generates the graphic image corresponding to the second video based on the converted image information.

5. The apparatus according to claim 1, wherein the second video is a free view-point video content at free view-point, which is generated based on video contents captured at a plurality of view-point positions.

6. The apparatus according to claim 1, wherein the second video is one video content constituting a multi view-point video content captured at a plurality of view-point positions.

7. The apparatus according to claim 1, wherein the processor further operates as a second determination unit which determines whether the graphic image corresponding to the first video has the directional attribute, and
wherein, in a case where the second determination unit determines that the graphic image corresponding to the first video has the directional attribute, the generation unit converts the image information by using the difference information, and in a case where the second determination unit determines that the graphic image corresponding to the first video does not have the directional attribute, the generation unit does not convert the image information.

8. A method for controlling an apparatus comprising:
acquiring first view-point information relating to a first video, second view-point information relating to a second video, and image information relating to a graphic image corresponding to the first video;
calculating difference information between the acquired first view-point information and the second view-point information;
determining whether a direction of a graphic image corresponding to the second video is to be rotated, in a direction different from a direction of the graphic image corresponding to the first video, according to a directional attribute that is information that the graphic image corresponding to the first video has;
converting the image information by using the difference information, in a case where the first determination unit determines that the direction of the graphic image corresponding to the second video is to be rotated in the direction different from the direction of the graphic image corresponding to the first video, and generating the graphic image corresponding to the second video based on the converted image information; and
synthesizing the generated graphic image and an image of the second video,
wherein the synthesizing synthesizes the graphic image corresponding to the first video with the second video as the graphic image corresponding to the second video, in a case where the determining determines that the direction of the graphic image corresponding to the second video is not to be rotated in the direction different from the direction of the graphic image corresponding to the first video, and
wherein the directional attribute is binary data indicating whether the direction of the graphic image corresponding to the first video differs in a display format depending on a view-point position or a line-of-sight direction.

9. The method according to claim 8,
wherein the first and the second view-point information include at least information relating to line-of-sight directions or to view-point positions of the first video and the second video.

10. The method according to claim 9, further comprising:
calculating an angle formed between the line-of-sight direction of the first video and the line-of-sight direction of the second video as difference information; and
rotating the graphic image corresponding to the first video by an angle represented by the calculated difference information to convert the image information, and generating the graphic image corresponding to the second video based on the converted image information.

11. The method according to claim 9, further comprising:
calculating a difference in distance between the view-point position of the first video and the view-point position of the second video as difference information; and
enlarging or reducing the graphic image corresponding to the first video depending on the difference in distance represented by the calculated difference information to convert the image information, and generating the graphic image corresponding to the second video based on the converted image information.

12. The method according to claim 8, wherein the second video is a free view-point video content at free view-point, which is generated based on video contents captured at a plurality of view-point positions.

13. The method according to claim 8, wherein the second video is one video content constituting a multi view-point video content captured at a plurality of view-point positions.

14. The method according to claim 8, further comprising determining whether the graphic image corresponding to the first video has the directional attribute,
wherein, in a case where the determining determines that the graphic image corresponding to the first video has the directional attribute, the converting converts the image information by using the difference information, and in a case where the determining determines that the graphic image corresponding to the first video does not have the directional attribute, the converting does not convert the image information.

15. A non-transitory computer readable storage medium storing a computer-executable program of instructions for causing a computer to perform a method comprising:
acquiring first view-point information relating to a first video, second view-point information relating to a second video, and image information relating to a graphic image corresponding to the first video;
calculating difference information between the acquired first view-point information and the second view-point information;
determining whether a direction of a graphic image corresponding to the second video is to be rotated, in a direction different from a direction of the graphic image corresponding to the first video, according to a directional attribute that is information that the graphic image corresponding to the first video has;
converting the image information by using the difference information, in a case where the first determination unit determines that the direction of the graphic image corresponding to the second video is to be rotated in the direction different from the direction of the graphic image corresponding to the first video, and generating the graphic image corresponding to the second video based on the converted image information; and
synthesizing the generated graphic image and an image of the second video,
wherein the synthesizing synthesizes the graphic image corresponding to the first video with the second video as the graphic image corresponding to the second video, in a case where the determining determines that the direction of the graphic image corresponding to the second video is not to be rotated in the direction different from the direction of the graphic image corresponding to the first video, and
wherein the directional attribute is binary data indicating whether the direction of the graphic image corresponding to the first video differs in a display format depending on a view-point position or a line-of-sight direction.

16. The non-transitory computer readable storage medium according to claim 15,
wherein the first and the second view-point information include at least information relating to line-of-sight directions or to view-point positions of the first video and the second video.

17. The non-transitory computer readable storage medium according to claim 16, further comprising:
calculating an angle formed between the line-of-sight direction of the first video and the line-of-sight direction of the second video as difference information; and
rotating the graphic image corresponding to the first video by an angle represented by the calculated difference information to convert the image information, and generating the graphic image corresponding to the second video based on the converted image information.

18. The non-transitory computer readable storage medium according to claim 15, wherein the second video is a free view-point video content at free view-point, which is generated based on video contents captured at a plurality of view-point positions.

19. The non-transitory computer readable storage medium according to claim 15, wherein the second video is one video content constituting a multi view-point video content captured at a plurality of view-point positions.

20. The non-transitory computer readable storage medium according to claim 15, further comprising determining whether the graphic image corresponding to the first video has the directional attribute,
wherein, in a case where the determining determines that the graphic image corresponding to the first video has the directional attribute, the converting converts the image information by using the difference information, and in a case where the determining determines that the graphic image corresponding to the first video does not have the directional attribute, the converting does not convert the image information.

* * * * *